Dec. 10, 1957  W. H. SHAPERO ET AL  2,815,896
FLEXIBLE CONTAINER
Filed July 28, 1955

INVENTORS
WALLACE H. SHAPERO
BY
Lynn H. Latta
ATTORNEY

United States Patent Office 2,815,896
Patented Dec. 10, 1957

2,815,896

FLEXIBLE CONTAINER

Wallace H. Shapero, Santa Ana, and Roy Elbert Davis, Burbank, Calif., assignors, by mesne assignments, to Wallace Container Company, Santa Ana, Calif., a corporation of California Application July 28, 1955, Serial No. 524,993

29 Claims. (Cl. 229—3.5)

This application is in part a continuation of our patent application S. N. 390,123 filed November 4, 1953, allowed January 28, 1955, for Flexible Container and Method of Making the Same and now forfeited; and is in part a continuation of our earlier application Serial Number 303,597 filed August 9, 1952, for Flexible Container and Method of Making the Same.

This invention relates to packaging. Its general objects are: (1) to provide an improved container having a combination of desirable characteristics including: (a) tensile strength; (b) toughness and flexibility-resistance to fracture, wear, etc.; (c) mechanical stiffness, i. e. form retention; (d) resistance to chemical deterioration from the action of the contents; (e) ability to become heat sealed in the presence of contents having characteristics such as to tend to deteriorate the container material.

The invention contemplates particularly the fabrication of containers of various types from synthetic resin plastic materials of the thermoplastic type including particularly the class of plastics that can be rendered relatively soft and pliable and yet quite tough and high in tensile strength (e. g., the polyvinyl chlorides). Included within the range of application of the invention to various packaging problems are tooth paste and cosmetic tubes; containers for articles sealed in a fluid or liquid medium of preservative, rust inhibiting or lubricating characteristics (e. g. bearings or other precision metal articles, sealed in a body of oil); containers for foods (e. g. fish or meat) sealed in juices or liquids having an oily content having deteriorative effect upon the softer plastic materials; containers for oils such as Vaseline; containers for oil paints and inks; etc.

One of the particular objects of the invention is to provide an improved compartmented container that can readily be sealed about one or more articles (such as bearings, sealed in oil) with each article occupying a compartment filled with a preservative liquid such as lubricating oil.

A particular object is to provide a container that can be fabricated inexpensively by dipping a mandrel into a succession of baths of film forming materials in liquid form, with intervening drying and curing steps, so as to provide a container wall composed of a succession of layers of materials having varying characteristics in accordance with the objects herein stated.

Another object is to provide an improved container capable of being readily sealed, by the application of heat, around a body or bodies of oil, grease, paint, an aqueous solution or mixture or paste, or a preservative liquid containing an article or series of articles to be preserved therein; having toughness and flexibility, yet capable of retaining its form throughout normal handling; and capable of resisting chemical deterioration from the oils and other substances in the preservative liquid, over long periods of time.

It will be apparent to those skilled in the art that this combination of characteristics is not known to be available in any of the synthetic resin plastic materials. The thermosetting resins do not have the characteristics of flexibility and toughness, but are relatively hard and brittle. On the other hand, the thermoplastic resins which might otherwise be suitable, are particularly subject to the deteriorative action of oils and greases such as are commonly present in cosmetics, lubricants, paints, etc.

In the container of the present invention, we have successfully combined all of the above mentioned desirable characteristics in a fully satisfactory manner, as will hereinafter be set forth more fully in detail.

Other objects will become apparent in the ensuing specifications and claims, when taken in connection with the appended drawing, in which:

Figures 1, 2, 3:
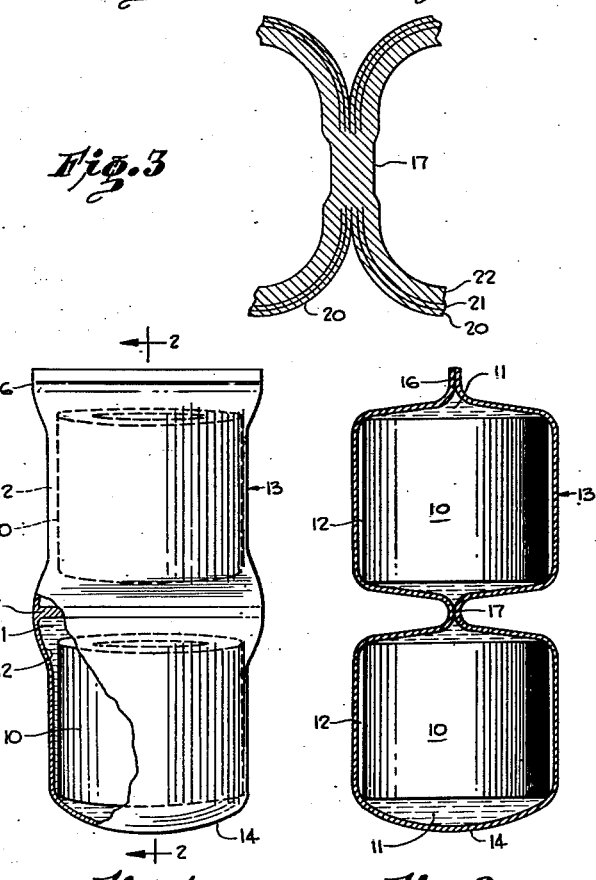
Fig. 1 is a perspective view of a package embodying one form of the invention, with parts broken away and shown in section.
Fig. 2 is a longitudinal sectional view of the same taken on the line 2—2 of Fig. 1.
Fig. 3 is an enlarged sectional detail of the partition seam of Fig. 2.

As an example of one packaging problem which is very satisfactorily solved by the invention, we have shown in Figs. 1 and 2 a package in which precision aircraft parts, such as the bearings 10, are sealed in bodies of lubricating or other preservative oil, indicated at 11, contained within compartments 12 within a tubular container 13. Container 13 may have a circular bottom 14 at one end, formed in the initial dipping operation by which the open container (before filling) is fabricated. Its opposite end is closed by a heat-sealed seam 16 in which the inner walls of opposite side portions of the container have been brought together and welded. Similarly, its central portion has a heat sealed seam 17 extending from side to side thereof and joined to the respective side extremities to seal off the compartments 12 one from the other. Thus preserved against contact with the atmosphere, such parts may be handled, transported and stored for long periods of time without becoming corroded or damaged in any way. The soft, flexible material of the container protects the bearings against scratching and has the characteristic of absorbing the sharp vibrations of handling shocks, which would tend to deteriorate the crystalline structure of hard metal. To take the rough handling that the packages are apt to receive during shipment and handling (i. e., to protect the container itself against rupture), the container is of a tough, flexible material. At the same time it has a sufficient amount of mechanical stiffness so that it is form retaining under normal conditions.

It will be apparent that the seams 16 and 17 must be produced after the container has been filled with the preservative liquid. We have discovered that this can be accomplished by heat sealing where the container wall is of thermoplastic material such as polyvinyl chloride or polyvinyl chloride and acetate co-polymer. However, such materials are not resistant to chemical deterioration in the presence of oily substances, and accordingly, a container fabricated simply from this material would not be suitable for the purpose.

The invention solves the problem of combining heat sealability and chemical deterioration resistance, by embodying in the container wall three or more layers of material including an interior coating 20 that is heat sealable and will readily release from a dipping mandrel; a middle layer or group of layers 21 resistant to chemical deterioration, adapted to function as a barrier to the migration of fluids and solvents including the contents of the container and plasticizers from other layers; and an outer body layer 22 of tough, flexible material. The latter forms the body of the container, being much thicker than either of the other two layers and having from 75% to 90% of the total wall thickness of the container. The middle layer and interior coating are relatively thin, having collectively only from 25% down to 10% or less than 10% of the total wall thickness. Both are of minimum thickness consistent with adequate performance of their individual functions and they may be of approximately the same thickness.

The relative thicknesses of the three layers may fall within the following range:

Interior layer—5% to 10% of total thickness;
Middle layer—5% to 15% of total thickness;
Body layer—90% to 75% of total thickness.

A preferred ratio of thicknesses is: interior layer—5%; middle layer—10%; body layer—85%.

The attempt to utilize a plurality of layers of plastic material having the wide variety of needed characteristics indicated above, inherently involves a number of problems that must be solved before a practical and successful container can be produced. Such problems include the following:

(1) The tube as a whole must be heat-sealable. Either all layers must soften under the application of the sealing heat, or, if use is made of an intervening layer that does not soften, it must be brittle enough to fragmentate under the pressure of the sealing tool, sufficiently to allow adjoining layers to come together between the fragments of the intervening layer, and in such a case, the adjoining layers must be adherent, one to another. Similarly, if an intervening layer is softened, in advance of adjoining layers, sufficiently to extrude away from the line of heat sealing pressure, the adjoining layers must adhere to one another in the area vacated by the intervening layer.

(2) Each layer must be adherent to its adjoining layer or layers, so that the tube will never de-laminate under any condition to which it may be subjected, including shocks, vibration, temperature changes, the action of chemicals in the contents of the tube, and aging processes.

(3) As one factor of the de-lamination problem, the layers must all have an elongation factor (extent of elongation in response to change in temperature and/or mechanical stress) within a common range, such that the adhesion between layers will adequately resist any tendency toward delamination under stress differentials (shear stress in the planes of adhering contact) resulting from the development of differentials in tension loading in the respective layers as the composite wall of the container is stretched under the maximum inflation loads to which the container is normally subjected (including a 200 pounds per square inch pressure injected into the container for blowing it off a mandrel on which it has been formed).

(4) The dipping method by which the container is fabricated requires that the materials of at least some of the layers be initially in solution so as to have adequately thin liquid consistency. A layer already applied to the dipping mandrel must be resistant to deterioration by the liquid film that is applied over it to constitute an adjoining layer. Also, the plasticizer in the outer body layer must be restrained from migrating throughout the thickness of the composite wall of the tube.

The lining 20, as previously stated, functions as a release coating for assisting removal of the container from the dipping mandrel; and is heat sealable, even in the presence of an oily content, for closing the container. A thermoplastic resin similar to that of the outer coating has been found to suitably meet these requirements. In the interest of reducing to a minimum the number of different materials used in fabricating the container, we prefer to use the same basic resin for both the lining and the outer body layer, and find that polyvinyl chloride or a copolymer of polyvinyl chloride and another resin, is particularly suitable in meeting the requirements of both the outer body layer and the lining. The primary difference between the composition of the two layers resides in a much higher plasticizer content in the outer body layer than in the lining.

The middle layer 21 includes a thermosetting material that is resistant to chemical deterioration and the action of solvent, and provides a barrier against the migration of plasticizer from the outer layer. It also has a very substantial content of a thermoplastic material, preferably closely related chemically to the material of the other two layers for intimate bonding therewith, and preferably utilizes the same basic resin as the other two layers.

The outer body layer 22 is of tough, flexible, heat sealable plastic material comprising a mixture of a plasticizer and a synthetic resin such as polyvinyl chloride or copolymer of polyvinyl chloride and another resin. In the interest of reducing to a minimum the number of different materials used in fabricating the container, we prefer to utilize the same basic resin in the lining 20, which may be plasticized to a lesser degree.

The plasticized resin, which may be designated as a plastisol, imparts to the outer body layer 22 the desired tough, flexible characteristic which actually makes the tube as much as ten times as strong (resistant to bursting under internal fluid pressure developed by squeezing the tube) as a metal tube of the same wall thickness.

For the basic resin of the thermoplastic material, we prefer polyvinyl chloride. Alternates that may be used are:

Polyvinyl chloride-acetate co-polymer
Polyvinyl chloride-vinylidene co-polymer
Polyvinyl chloride-maleate co-polymer
Polyvinyl chloride-acrylonitrile co-polymer.

The percentage of plasticizer in the outer body layer may be in the range of around 40%, the remainder of the material being the thermoplastic resin. The plasticizer must be compatible with the resin with which it is mixed. Typical examples of basic plasticizer materials that can be used are:

(a) Di-2 ethyl hexyl phthalate
(b) Di-iso-octyl hexyl phthalate
(c) Di-2 ethyl hexyl tetra phthalate The lining, as previously stated, may comprise a mixture of the basic vinyl chloride resin and a relatively low percentage (e. g. 10%) of plasticizer, or may be substantially the pure unplasticized basic resin. The plasticizer used in such lining material is preferably a mixture of di-2 ethyl hexyl phthalate and polymeric alkyd plasticizer such as the plasticizer known commercially as "Paraplex–G–40," made and sold by Rohm and Haas. Such a plasticizer has high resistance to oils, gasoline, and heat, though readily soluble in esters, ketones, aromatic hydro-carbons and chlorinated hydro-carbons, and is compatible with vinyl chloride resins. Next in the order of preference as plasticizers are mixtures as follows: (b) di-iso-octyl hexyl phthalate; (c) di-2 ethyl hexyl tetra phthalate and (d) polymeric alkyd. As an example of a suitable plasticizer mixture for the lining, we may employ a mixture comprising a mixture of about 75% of the "G–40" material, and about 25% of di-octyl phthalate material. The percentage of the latter material may range from 25% down to 5%. Another example of a suitable plasticizer is a mixture comprising substantially 75% of the "G–40" material and 25% of tri-cresyl phosphate.

The minor ingredient (e. g. di-octyl phthalate) of the plasticizer in the lining, functions to provide the heat sealing characteristic. Because the plasticizer for the lining is quite viscous, it is necessary in order to obtain a desired fluidity in the dipping solution 20′, to thin down the material in this solution by adding a volatile solvent, such as xylene, toluene, benzene, or other solvent in the aromatic hydrocarbon group, those named being preferred. It is also possible to utilize as the solvent, methylethyl ketone or other ketones.

As previously stated, the middle layer 21 may comprise a mixture of the basic thermoplastic resin of the other layers together with a thermosetting resin. Such thermosetting resin may be urea formaldehyde, phenol formaldehyde, di-ethylene glycol di-methacrylate, or a complex polymer of epoxy-bisphenol compounds commonly known as "Epon" resins. In the middle layer, the thermosetting material constitutes a minor portion of the mixture. The percentage of thermosetting resin in the total resin content of the middle layer may range from 5% to 25%.

Alternatively, instead of the mixture of thermo-setting and thermoplastic materials designated above, the middle layer may be simply an unplasticized polyvinyl chloride-acrylonitrile copolymer. This material has the desired quality of resistance to chemical deterioration.

Like the lining, the middle layer has a relatively low plasticizer content preferably the same as that of the lining. Such low plasticizer content adds to the stiffness provided by the middle layer and lining. The plasticizer for the middle layer may comprise substantially 100% "G-40," or nearly 100%, with a small proportion of di-octylphthalate or tri-cresyl phosphate added. The middle layer material likewise must be thinned with a solvent (one of those specified for the lining) for adequate fluidity of the dipping solution 21'.

An important function of the middle layer is to provide a barrier between the interior and outer layers, to prevent the solvent in the outer layer from penetrating to the lining and plasticizing it while the outer layer is drying, which would render the inner layer undesirably soft. The middle layer also functions as a barrier to prevent migration of the relatively higher percentage of plasticizer of the outer body layer into the other layers.

Instead of the homogeneous mixture of thermoplastic and thermosetting resin, the middle layer may consist in separate sub-layers, one of thermoplastic resin and the other of thermosetting resin, integrally united either directly or through an intervening adhesive layer. The thermosetting ingredient of the middle layer may be a modified nylon material having an additive such as formaldehyde, giving the nylon material a thermosetting character. Nylon, as is well known, is a generic term used to describe linear polymeric amides now in widespread commercial use. As a further alternative, the middle layer may consist in associated layers of polyvinylidene chloride (Saran) and a modified nylon resin with thermosetting characteristics such as that indicated above. For example, the middle layer may consist in two layers of Saran with an intervening layer of the modified nylon functioning both as an adhesive and as a barrier, or may consist in two layers of the modified nylon (giving adherence to the body layer and the inner layer), and an intervening layer of Saran.

Where Saran material is used, an adhesive layer is interposed between the Saran layer and either the outer or the inner plasticized vinyl layer to which the Saran is to be joined.

The lining, instead of being the plasticized vinyl chloride material specified above, may be a modified Saran material such as that specified by Dow Chemical Company as Saran F-120 (a vinylidene acrylo-nitrile material) having the desired combination of release characteristic and heat sealability.

In selecting an arrangement of layers, the following rules must be observed:

(A) Nylon will not adhere directly to the plasticized vinyl body layer. An acrylo-nitrile layer may be interposed between the two.

(B) Saran material will not adhere directly to plasticized vinyl resin. There must be an intervening layer of adhesive which can be (1) epoxy-resin, or (2) a combination nylon layer adjoining the Saran layer and an acrylonitrile layer between the nylon layer and the plasticized vinyl body layer.

(C) The order of arrangement of materials in the laminated structure must take into account the question of whether the solvent of one layer will affect an adjoining layer. For example, water and alcohol (solvents used with nylon) do not effect Saran. The ketones and hydrocarbon solvents used with Saran do not affect nylon, nor do the solvents used with the vinyl resins. The thermosetting resins such as the aldehydes hereinbefore referred to, are not affected by the ketones and the hydrocarbon solvents. When cured, these thermosetting resins are inert to alcohol and water as well.

The slightly plasticized lining and middle layers may be characterized as organisols and the outer body layer as a plastisol.

In the middle layer, the toxicity of the material is disregarded. The same is true of the outer body layer. However, in applications where toothpaste or a food substance is to be enclosed, the lining must be nontoxic. Any of the vinyl chloride polymers or copolymers mentioned above as the basic material for the interior layer, will provide this characteristic.

It may now be noted that where the three layers have basic component materials which are the same or chemically related, maximum adherence of the three layers each to the other is assured. This is true even though the middle layer has a fairly high content of thermosetting material, for the desired chemical resistance and stiffness.

The lining, having little or no thermosetting resin content, but being on the contrary almost purely of heat sealable resin, provides for maximum bonding capacity in the heat sealing operation. Even though this lining may be deteriorated by the action of chemicals and solvents in the contents of the container, such action will be arrested by the barrier action of the middle layer and will not spread to either the outer layer or into the seams 16, 17. Despite the relative stiffness of the material constituting the lining and middle layer, their relative thinness and the closeness of the bond between the three layers of the container, together with the toughness and flexibility of the outer body layer, results in a composite tube wall structure of such homogeneity that the thin lining and middle layer borrow the flexibility of the thicker body layer so that the tube as a whole has the characteristic of being highly flexible, within the range required in the conventional flexible tube or container structure, while the lining is supported against cracking under the effect of the flexing action.

The following are examples of laminated container wall structure utilizing the combinations disclosed above:

*Example I*

Lining—slightly plasticized polyvinyl chloride (high heat sealability and release)
Middle—homogeneous mixture of an aldehyde resin and vinyl chloride resin (barrier)
Body—polyvinyl chloride plastisol (tough, resilient, supporting wall)

*Example II*

Same as Example I, utilizing an epoxy resin instead of an aldehyde as the thermosetting barrier material.

*Example III*

Same as Example I or Example II but using one of the specified copolymers instead of the vinyl chloride polymer as the basic resin.

*Example IV*

Lining—slightly plasticized vinyl resin (high heat sealability and release)
Middle (multiple):
  1. Epoxy resin (adhesive)

2. Nylon modified by formaldehyde additive (barrier)
3. Epoxy (adhesive)
Outer—vinyl chloride plastisol (body)

*Example V*

Lining—modified Saran F-120 (release)
Middle (multiple):
 1. Modified nylon (oil barrier)
 2. Saran (water barrier)
 3. Modified nylon (plasticizer barrier)
 4. Acrylo-nitrile (adhesive)
Outer—vinyl chloride plastisol (body)

*Example VI*

Lining—modified Saran (release)
Middle (multiple):
 1. Modified nylon (oil barrier)
 2. Acrylo-nitrile or epoxy resin (adhesive)
Outer—vinyl chloride plastisol (body)

Figure 4:
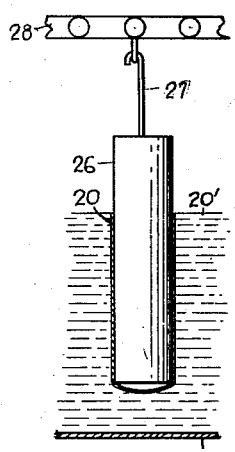
Figs. 4, 5 and 6 are views showing three successive stages in the method of fabricating the container of the invention.
Figure 5:
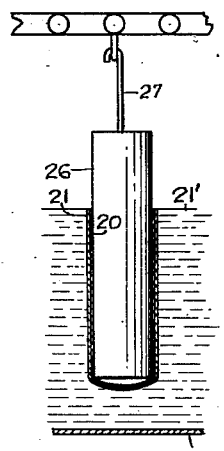
Figure 6:
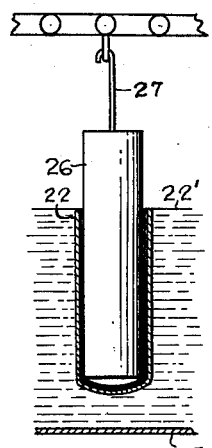

Figs. 4, 5 and 6 illustrate the method of fabricating container 13, wherein material for coatings 20, 21 and 22, suitably thinned by solvents, is constituted in dipping solutions 20', 21', 22' contained in tanks 23, 24, 25, and wherein a series of mandrels 26, suspended by stems 27 on a conveyor 28, are first preheated and then dipped successively in tanks 23, 24 and 25 to cause the successive coatings 20, 21, 22 to adhere to the mandrel and to one another, with intervening steps wherein each layer is cured before the next layer is applied. When the lining and middle layer have been applied, the curing step that follows is preferably one in which the mandrels are passed through a heated oven, the temperature of the mandrel being thereby raised to a degree such as to cause the final coat to acquire a greater thickness than the combined thicknesses of the first two layers.

Figure 7:
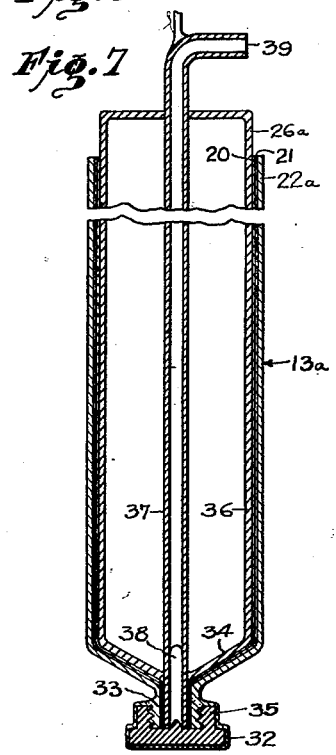
Fig. 7 is a detail sectional view showing the fabrication, in accordance with the invention, of a tooth paste or cosmetic tube.

Fig. 7 illustrates the applicability of the invention to a flexible tube 13a having a cap 31 that is covered by a thin membrane 32 of the body layer 22a. Such a tube may be formed on a mandrel 26a having a shoulder 34 for shaping the shoulder 35 of the tube, and having an axis tube 37 an end portion of which projects beyond shoulder 34 to support a cap 31, the latter having a stem 38 for reception in tube 37. The suspended cap 31 becomes filled with solution 22' which hardens to form the neck 33 of the tube. The upper end of tube 37 may have a fitting 39 for application to an air pressure line through which air under pressure may be injected into the tube to inflate it and force it off the mandrel.

We claim:

1. A container having a laminated wall comprising an outer body layer of relatively tough, flexible thermoplastic resin; a middle layer, resistant to chemical deterioration from contents, said middle layer comprising a mixture of thermoplastic and thermosetting resins; and an interior layer of heat sealable thermoplastic resin, said layers being integrally united.

2. A container as defined in claim 1, wherein said outer layer has a thickness of from 75% to 90% of the aggregate thickness of all three layers.

3. A container as defined in claim 1, wherein the percentages of total wall thickness for the three layers are 75% to 90% for the outer layer, 5% to 15% for the middle layer, and 5% to 10% for the interior layer.

4. A container as defined in claim 1, wherein said outer and interior layers each embodies a basic resin selected from the group consisting of polyvinyl chloride monomer and polyvinyl chloride copolymers; and wherein said middle layer includes a basic resin selected from the same group and has, as the thermosetting component thereof, a material selected from the group consisting of urea formaldehyde, phenol formaldehyde, and di-ethylene glycol di-methacrylate.

5. A container as defined in claim 1, wherein said outer and interior layers each embodies a basic resin selected from the group consisting of polyvinyl chloride monomer and polyvinyl chloride copolymers; and wherein said middle layer includes a basic resin and has, as the thermosetting component thereof, an aldehyde resin selected from the same group.

6. A container as defined in claim 1, wherein said outer and interior layers each embodies the same basic resin selected from the group consisting of polyvinyl chloride monomer and polyvinyl chloride copolymers; and wherein said middle layer includes a basic resin selected from the same group and has, as the thermosetting component thereof, an aldhyde resin, said outer layer having a high plasticizer content and being relatively tough and flexible and the other layers being relatively stiff and hard.

7. A container as defined in claim 1, wherein the material of said outer body layer is a polyvinyl chloride plastisol; the material of said middle layer is a homogeneous mixture of an aldehyde resin and a vinyl chloride resin; and the material of said interior layer is a slightly plasticized polyvinyl chloride.

8. A container as defined in claim 1, wherein the material of said outer body layer is a polyvinyl chloride plastisol; the material of said middle layer is a homogeneous mixture of an epoxy resin and a vinyl chloride resin; and the material of said interior layer is a slightly plasticized polyvinyl chloride.

9. A container as defined in claim 1, wherein the material of said outer body layer is a plastisol co-polymer of polyvinyl chloride and a resin selected from the group consisting of acetate, vinylidene, maleate and acrylo-nitrile resins; wherein the material of said middle layer is a homogeneous mixture of a vinyl chloride resin and a resin selected from the group consisting of aldehydes and epoxy resins; and wherein the material of said interior layer is a slightly plasticized vinyl chloride resin.

10. A container as defined in claim 1, wherein the material of said outer body layer is a vinyl chloride plastisol; said middle layer is constituted of a plurality of sub-layers including a barrier layer of nylon resin modified by an additive selected from the group consisting of epoxy resins and aldehydes to impart a thermosetting characteristic thereto, and adhesive layers of epoxy resin interposed between said barrier layer and said outer and interior layers respectively; and wherein the material of said interior layer is a slightly plasticized vinyl chloride.

11. A container as defined in claim 1, wherein the material of said outer layer is a vinyl chloride plastisol; the material of said interior layer is an acrylo-nitrile modified polyvinylidene chloride resin with good release characteristics; and said middle layer is constituted of several sub-layers including an oil-barrier layer embodying a linear polymeric amide resin with a thermosetting additive adhering to said interior layer, a water barrier layer comprising a polyvinylidene resin, adhering to said oil barrier layer, a plasticizer barrier layer of linear polymeric amide resin with a thermosetting additive, adhering to said water barrier layer, and an adhesive layer comprising acrylo-nitrile resin, interposed between and joining said plasticizer barrier layer and said outer body layer.

12. A container as defined in claim 1, wherein the material of said outer body layer is a vinyl chloride plastisol; said interior layer is of a polyvinylidene chloride acrylo-nitrile material and said middle layer is constituted of a number of sub-layers including an oil barrier layer of linear polymeric amide resin modified by a material imparting a thermosetting characteristic thereto, and an adhesive layer of resin selected from the group consisting of acrylo-nitrile and epoxy resins, interposed between and joining said oil barrier layer and said outer body layer.

13. A container as defined in claim 1, wherein said outer body layer is composed of a polyvinyl chloride plastisol and constitutes a majority of the thickness of said wall; wherein the thermoplastic material of said interior wall is a modified material including an additive conferring a good release characteristic thereto; and wherein said intermediate layer consists of a plurality of sub layers including a pair of oil and plasticizer barriers composed of a modified linear polymeric amide resin including a thermo-setting additive, a water barrier layer of a material that is primarily polyvinylidene chloride resin, and an acrylo-nitrile adhesive layer interposed between one of said modified linear polymeric amide layers and said outer body layer.

14. A container as defined in claim 1, wherein the material of said middle layer is a homogeneous mixture of an epoxy resin and a vinyl chloride resin.

15. A container as defined in claim 1, wherein the material of said middle layer is a homogeneous mixture of a vinyl chloride resin and a resin selected from the group consisting of aldehydes and epoxy resins.

16. A container as defined in claim 1, wherein said middle layer is constituted of a plurality of sub-layers including a barrier layer of linear polymeric amide resin modified by an additive selected from the group consisting of epoxy resins and aldehydes to impart a thermosetting characteristic thereto, and adhesive layers of epoxy resin interposed between said barrier layer and said outer and interior layers respectively.

17. A container as defined in claim 1, wherein the material of said interior layer is an acrylo-nitrile modified polyvinylidene chloride resin with good release characteristics; and said middle layer is constituted of several sub-layers including an oil-barrier layer embodying a linear polymeric amide resin with a thermo-setting additive adhering to said interior layer, a water barrier layer comprising a polyvinylidene resin, adhering to said oil barrier layer, a plasticizer barrier layer of linear polymeric amide resin with a thermo-setting additive, adhering to said water barrier layer and an adhesive layer comprising acryo-nitrile resin, interposed between and joining said plasticizer barrier layer and said outer body layer.

18. A container as defined in claim 1, wherein said middle layer is constituted of a number of sub-layers including an oil barrier layer of linear polymeric amide resin modified by a material imparting a thermosetting characteristic thereto, and an adhesive layer of resin selected from the group consisting of acrylo-nitrile and epoxy resins, interposed between and joining said oil barrier layer and said outer body layer.

19. A container as defined in claim 1, wherein said middle layer is constituted of a plurality of sub-layers including two layers of polyvinylidene chloride resin and an intervening barrier and adhesive layer of linear polymeric amide resin modified by a thermosetting additive, adhesively joining said two layers.

20. A container as defined in claim 1, wherein said outer body layer constitutes a majority of the thickness of said laminated wall, and is a plastisol including a vinyl chloride resin and a plasticizer selected from the group consisting of (a) di-2 ethyl hexyl phthalate and polymeric alkyd materials (b) di-iso-octyl hexyl phthalate (c) di-2 ethyl hexyl tetra phthalate, and (d) a mixture of any of the foregoing plasticizers with polymeric alkyd.

21. A container as defined in claim 1, wherein said outer and interior layers each embodies a basic resin selected from the group consisting of polyvinyl chloride monomer and polyvinyl chloride copolymers; and wherein said middle layer includes a basic resin and has, as the thermosetting component thereof, urea formaldehyde resin selected from the same group.

22. A container as defined in claim 21, wherein said outer layer is highly plasticized and the other layers are only slightly plasticized, whereby the outer layer is of relatively higher toughness and flexibility than said other layers, said other layers being relatively thin and being integrally united to said outer layer and thereby supported against cracking under flexure.

23. In a container for oily materials, a laminated wall structure comprising an outer body layer of relatively tough, flexible thermo-plastic resin selected from the group consisting of polyvinyl chloride and polyvinyl chloride and acetate co-polymer; a middle layer, resistant to chemical deterioration from the contents, comprising a mixture of one of said thermoplastic resins and a thermosetting resin, both in substantial proportions, said thermosetting resin being selected from the group consisting of urea formaldehyde and phenol formaldehyde; and an interior lining layer comprising a thermoplastic resin selected from the same group as the outer layer, said interior layer being heat sealable in the presence of the oily contents, whereby the container may be sealed by welding opposed portions of the inner wall of said interior layer together.

24. A container comprising a laminated wall structure comprising an outer body layer of relatively tough, flexible polyvinyl chloride thermoplastic resin; a middle layer, resistant to chemical deterioration from the contents, comprising a mixture of said thermo-plastic resin and a thermo-setting resin, both in substantial proportions, said thermo-setting resin being selected from the group consisting of urea formaldehyde and phenol formaldehyde; and an interior lining layer comprising polyvinyl chloride thermo-plastic resin, said interior layer being heat sealable in the presence of the oily contents, whereby the container may be sealed by welding opposed portions of the inner wall of said interior layer together.

25. A container for oily materials, comprising a tubular lateral wall and a bottom, both formed integrally of a laminated wall structure comprising an outer body layer of relatively tough, flexible polyvinyl chloride and acetate co-polymer thermo-plastic resin; a middle layer, resistant to chemical deterioration from the contents, comprising a mixture of a thermo-plastic resin and a thermo-setting resin, both in substantial proportions, said thermo-setting resin being selected from the group consisting of urea formaldehyde and phenol formaldehyde; and an interior lining layer comprising a polyvinyl chloride and acetate co-polymer, said interior layer being heat sealable in the presence of the oily contents, whereby the container may be sealed by welding opposed portions of the inner wall of said interior layer together.

26. A container having a laminated wall comprising a tough, flexible outer body layer constituting a majority of the thickness of said wall and composed of a plastisol including a vinyl chloride resin; a middle layer, resistant to chemical deterioration from contents and functioning as a barrier against migration of solvent and plasticizer materials of said wall and of oils from contents, said middle layer being constituted of a plurality of sub-layers including a pair of oil-barrier layers composed of linear polymeric amide resin and an additive imparting a thermo-setting characteristic thereto, a water barrier layer interposed between and joining said oil barrier layers, and an adhesive layer of acrylo-nitrile resin interposed between and joining said outer body layer and one of said oil barrier layers; and an interior layer composed of a thermoplastic material of less plasticity than said outer body layer, providing a release surface and a heat-sealable lining.

27. A container having a laminated wall comprising a tough, flexible outer body layer constituting a majority of the thickness of said wall and composed of a plastisol including a vinyl chloride resin; a middle layer, resistant to chemical deterioration from contents and functioning as a barrier against migration of solvent and plasticizer materials of said wall and of oils from contents, said middle layer comprising a mixture of thermoplastic and thermo-setting resins; and an interior layer composed of a thermoplastic material of less plasticity than said outer body layer, providing a release surface and a heat-sealable lining.

28. A container as defined in claim 27, wherein said thermo-setting resin is selected from the group consisting of urea and phenol aldehydes, di-ethylene glycol di-methacrylate, and complex polymers of epoxy-bisphenol compounds known as epon resins, and constitutes a minor portion of said mixture; and wherein said thermoplastic resin is closely related chemically to the resins in said outer and interior layers.

29. A container having a laminated wall comprising a tough, flexible outer body layer constituting a majority of the thickness of said wall and composed of a plastisol including a vinyl chloride resin; a middle layer, resistant to chemical deterioration from contents and functioning as a barrier against migration of solvent and plasticizer materials of said wall and of oils from contents, said middle layer consisting of an unplasticized polyvinyl chloride-acrylonitrile copolymer; and an interior layer composed of a thermoplastic material of less plasticity than said outer body layer providing a release surface and a heat-sealable lining.

No references cited.